(12) United States Patent
Hayashibe et al.

(10) Patent No.: US 7,353,528 B2
(45) Date of Patent: Apr. 1, 2008

(54) OPTICAL RECORDING MEDIUM AND ITS MANUFACTURING METHOD

(75) Inventors: Kazuya Hayashibe, Kanagawa (JP); Katsuya Ohwada, Miyagi (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 10/276,126

(22) PCT Filed: Feb. 19, 2002

(86) PCT No.: PCT/JP02/01412

§ 371 (c)(1),
(2), (4) Date: Feb. 10, 2004

(87) PCT Pub. No.: WO02/073611

PCT Pub. Date: Sep. 19, 2002

(65) Prior Publication Data
US 2006/0072435 A1 Apr. 6, 2006

(30) Foreign Application Priority Data
Mar. 14, 2001 (JP) ............................. 2001-71793

(51) Int. Cl.
*G11B 23/03* (2006.01)
(52) U.S. Cl. .................................................. 720/718
(58) Field of Classification Search ................ 369/283, 369/284, 286, 288, 275.2, 275.1
See application file for complete search history.

(56) References Cited

U.S. PATENT DOCUMENTS 5,158,859 A * 10/1992 Imatake et al. ........ 430/270.11
5,185,233 A * 2/1993 Santo ....................... 430/270.1
5,354,590 A * 10/1994 Tamura et al. ............. 428/64.8
5,424,106 A * 6/1995 Yamada et al. ............ 428/64.6
5,475,656 A * 12/1995 Sato et al. ................ 369/13.37
5,545,454 A * 8/1996 Yamada et al. ............ 428/64.1
6,061,307 A * 5/2000 Shimazaki et al. ........ 369/13.1
6,436,524 B1* 8/2002 Ishida et al. ................ 428/332
6,802,073 B1* 10/2004 Takahashi et al. .......... 720/718
2004/0047281 A1* 3/2004 Nishihara et al. ........... 369/283

FOREIGN PATENT DOCUMENTS

| EP | 1039448 | 9/2000 |
| JP | 3040238 | 2/1991 |
| JP | 5342629 | 12/1993 |
| JP | 2002117577 | 4/2002 |
| JP | 2002123977 | 4/2002 |
| WO | 9847142 | 10/1998 |
| WO | 9930908 | 6/1999 |

* cited by examiner

Primary Examiner—Allen Cao
(74) Attorney, Agent, or Firm—Sonnenschein Nath & Rosenthal LLP

(57) ABSTRACT

A multi-layered film made of sequentially stacked first dielectric layer, recording layer, record-assist layer, second dielectric layer and first reflection layer on a disc substrate having a concavo-convex structure at least on one surface thereof. An ultraviolet-setting resin layer is formed to cover the multi-layered film. The record-assist layer is controlled in thickness to satisfy the relation $d/4 < a < 3d$, or more preferably the relation $d/2 \leq a \leq 2d$, between the thickness d of the recording layer and the thickness $a$ of the record-assist layer. The stacking order of the multi-layered film may be opposite. In this case, a light-transmitting sheet is provided to cover the multi-layered film via a bonding layer.

39 Claims, 8 Drawing Sheets

OPTICAL RECORDING MEDIUM AND ITS MANUFACTURING METHOD

TECHNICAL FIELD

This invention relates to an optical recording medium and its manufacturing method especially suitable for application to an optical recording medium employing a land/groove recording technique.

BACKGROUND OF THE INVENTION

Recently, along with enhancement of recording density of optical recording mediums such as optical discs, development of the technique of effectively using the area on the recording surface of an optical disc has been pushed forward to enhance the recording density.

The recording surface of any disc substrate has concavo-convex called lands and grooves respectively. In conventional optical discs, only lands or only grooves were used to record recording marks. However, with the need of enhancing the recording density of optical discs, a technique for recording record marks on both lands and grooves, i.e. a land/groove recording technique, has been brought into use as a format of optical discs. An example of optical discs combined with the land/groove recording as their format is DVD-RAM (Digital Versatile Disc-Random Access Memory).

However, such optical discs employing the land/groove recording suffer a difference of the thermal property exerted to the recording layer because of the difference in physical configuration between lands and grooves when recording laser beams are irradiated to lands and grooves respectively. In addition, lands and grooves form a periodical structure close to the wavelength of the laser beams. Therefore, vector diffraction of light causes uneven distribution of irradiated laser beams between lands and grooves, and it has been difficult to record or reproduce record marks from both lands and grooves with a high C/N ratio (carrier-to-noise ratio).

To match lands and grooves in property, it is contemplated, for example, to change widths of lands and grooves and thereby change the duty ratio. However, only change of the duty ratio cannot bring about ample freedom. Under the circumstances, an optical disc was proposed, in which the recording layer on grooves is formed thicker than the recording layer on lands by selecting the sputtering condition, for example (Japanese Patent Laid-Open Publication No. 2000-215511, referred to as Literature 1).

However, in case of the optical disk disclosed in Literature 1, the condition for deposition of the recording layer is changed to form the recording layer on grooves thicker than the recording layer on lands. This condition digresses the optimum condition for deposition of the recording layer and invites deterioration of signal characteristics of the recording layer.

Therefore, it has been demanded to develop a method capable of independently controlling the recording characteristics of lands and grooves.

It is therefore an object of the invention to provide an optical recording medium having a multi-layered film of a recording layer and a record-assist layer stacked adjacently on one surface of a disc substrate having formed a concavo-convex structure, and its manufacturing method, which enable freer designing while ensuring good signal characteristics in the recording layer on the concavo-convex structure and ensuring high reliability.

SUMMARY OF THE INVENTION

The Inventor made vigorous researches to overcome the above-discussed problems the conventional techniques involved. The researches are outlined below.

The recording principle of conventional optical mediums having a multi-layered film of a recording layer for recording information signals and a record-assist layer for supporting the recording layer is presumed to rely upon that, when the temperature is raised higher than the crystallization temperature lower than the melting point of the recording layer by laser beams irradiated to the recording layer, minute crystals produced in the crystallized auxiliary layer, and crystal growth of the recording layer occurs from the minute crystals as the seed crystals. This principle has been brought about because record marks are different in amplitude between optical discs having the auxiliary layer and optical discs without the auxiliary layer.

The Inventor put forward the researches on the record-assist layer under the above presumption. That is, the Inventor recorded 2T pulses on samples common in duty ratio but variously different in thickness of the record-assist layer, and measured dependency of a carrier upon the recording power in lands and grooves, respectively. As a result, the Inventor has found that the dependency of the carrier upon the recording power in lands exhibits similar tendencies regardless of the thickness of the film and that there is almost no change of the carrier in lands even when the thickness of the record-assist layer is changed. On the other hand, as to the dependency of the carrier upon the recording power in grooves, the Inventor has found that, although the dependency of the carrier upon the recording power in lands exhibits similar tendencies regardless of the thickness of the film, when the record-assist layer is changed thickness, the carrier rises as the thickness decreases. This tendency was observed in the range close to the optimum value.

Accordingly, the Inventor got inspiration of using the phenomenon confirmed by the above-explained experiment. That is, in case the duty ratio and the recording power are fixed, dependency of the carrier upon the thickness of the record-assist layer arises particularly in grooves, ad the dependency upon the thickness does not almost appear in lands. From this fact, the Inventor had the idea that the carriers can be brought into agreement between lands and grooves without the need of changing the duty ratio.

The Inventor made further researches on changes of the carrier in grooves. That is, the Inventor calculated how the change of amplitude of the recording layer of GeTe alloy depends upon the thickness of the record-assist layer by the effective Fresnel coefficient method. From the result of the calculation, the Inventor got the knowledge that the amplitude increases as the thickness of the record-assist layer decreases. With reference to the value when the thickness of the record-assist layer was 30 nm, when the thickness was decreased from 20 nm to 10 nm, the increase of the amplitude was approximately 1 dB according to the calculation by the effective Fresnel coefficient method.

Through the researches by the Inventor, the above-explained phenomenon can be assumed to occur because grooves are closer to the optical pickup than lands and less affected by track grooves, and therefore become more liable to reflect the amplitude changes in response to changes of the reflectance due to the difference of the thickness. In regard to the carrier changes on the part of the grooves, the amplitude changes of the reflectance by the change of the film structure are considered to be dominant.

The present invention has been made based on the above-explained researches.

To accomplish the object, the first aspect of the invention is an optical recording medium comprising:

a disc substrate having formed a concavo-convex structure formed on at least on one surface thereof; and a multi-layered film made by stacking at least a recording layer capable of recording information signals by irradiation of a laser beam and a record-assist layer adjacent to the recording layer on the surface of the disc substrate having the concavo-convex structure, wherein d/4<$\underline{a}$<3d is satisfied where d is the thickness of the recording layer and $\underline{a}$ is the thickness of the auxiliary recording layer.

The second aspect of the invention is a method of manufacturing an optical recording medium, which forms a multi-layered film made by stacking at least a recording layer capable of recording information signals by irradiation of a laser beam and a record-assist layer adjacent to the recording layer on the surface of the disc substrate having the concavo-convex structure, comprising:

adjusting the thickness of the record-assist layer to satisfy $$d/4<\underline{a}<3d$$

where d is the thickness of the recording layer and $\underline{a}$ is the thickness of the record-assist layer.

In the present invention, d/2≦a≦2d is preferably established when the thickness of the recording layer is d and the thickness of the record-assist layer is $\underline{a}$.

In the present invention, the recording layer is typically configured to record the information signals by reversible changes at least between two different states, and it is preferably made of a phase-changeable material capable of recording the information signals by phase changes between a crystal phase and an amorphous phase.

In the present invention, the laser beam used for recording and/or reproducing information signals is typically irradiated to said recording layer from one side of the multi-layered film where the disc substrate exists. In this case, the recording layer is preferably located nearer to the irradiation side of the laser beam. More specifically, the multi-layered film is preferably made of a first dielectric layer, recording layer, record-assist layer, second dielectric layer and first reflection layer that are stacked sequentially from near the surface of the disc substrate having formed the concavo-convex structure. Preferably, a layer of a synthetic resin such as a ultraviolet-setting resin (urethane-family, acrylic family, silicon family, polyester family, and so on) of a hot-melt adhesive agent is additionally formed on the top surface of the multi-layered film on the disc substrate (the surface opposite from the disc substrate) to cover the multi-layered film on the disc substrate for the purpose of protecting and reinforcing the multi-layered film. Typically, the first dielectric layer and the second dielectric layer are made of zinc sulfide/silicon oxide mixture ($ZnS$—$SiO_2$) having a diffractive index around 2.1 or a silicon nitride ($SiN$, $Si_3N_4$) having a diffractive index around 2.0. However, other materials are also usable. In the resent invention, thickness of the first dielectric layer is adjusted not to exceed 200 nm within the range capable of forming the dielectric layer not to disconnect in form of islands. In the present invention, the second dielectric layer is typically adjusted in thickness in the range not smaller than 1 nm and not smaller than 100 nm. In the present invention, thickness of the first reflection layer is adjusted not to be smaller than 20 nm and not to be larger than 100 nm. The first dielectric layer, recording layer, record-assist layer, second dielectric layer and first reflection layer are typically formed by sputtering, but any other film-making methods are also usable, such as electron beam vapor deposition, vacuum vapor deposition, epitaxial growth, chemical vapor deposition (CVD) and physical vapor deposition (PVD).

In the present invention, the laser beam used for recording and/or reproducing information signals is irradiated to the recording layer typically from one side of the disc substrate where the multi-layered film exists. In the present invention, the multi-layered film is preferably made of a second reflection layer, third dielectric layer, said record-assist layer, said recording layer and a fourth dielectric layer that are stacked sequentially from near one surface of the disc substrate having said concavo-convex structure, and a light-transmitting layer permitting the laser beam to pass through is preferably formed to cover the multi-layered film on the disc substrate. Although the third dielectric layer and the fourth dielectric layer are typically made of $ZnS$—$SiO_2$ having a diffractive inde3x around 2.1, or $SiN$ or $Si_3N_4$ having a diffractive index around 2.0, other materials can be used as well. In the present invention, thickness of the third dielectric layer is typically adjusted in the range not thinner than 1 nm and not thicker then 100 nm. In the present invention, thickness of the fourth dielectric layer is adjusted not to exceed 200 nm within the range capable of forming the dielectric layer not to disconnect in form of islands. In the present invention, the second reflection layer is adjusted in thickness typically in the range not thinner than 20 nm and not thicker than 100 nm. Although the second reflection layer, third dielectric layer, record-assist layer, recording layer and fourth dielectric layer are typically formed by sputtering, but any other film-making methods are also usable, such as electron beam vapor deposition, vacuum vapor deposition, epitaxial growth, chemical vapor deposition (CVD) and physical vapor deposition (PVD). The light-transmitting layer formed to cover the multi-layered film on the disc substrate includes at least a light-transmitting sheet permitting light to pass through and an adhesive layer for bonding the light-transmitting sheet to the disc substrate. The adhesive layer is an ultraviolet-setting resin or a pressure sensitive tackiness agent. Instead of using the light-transmitting sheet, an ultraviolet-setting resin is usable to form the light-transmitting layer.

An example of optical discs configured for irradiation of a laser beam to the disc substrate from one side thereof having the multi-layered film is DVR (digital video recording system) having a thin light-transmitting layer. This invention is applicable to optical discs such as DVR, including so-called DVR-red configured to record or reproduce information signals by using a semiconductor laser having an emission wavelength around 650 nm and so-called DVR-blue configured to record or reproduce information signals by using a semiconductor laser having an emission wavelength around 400 nm. Such DVR is configured to record signals by using an objective lens that is typically enhanced in NA (Numerical Aperture) to around 0.85 by combining two lenses in series. More specifically, it has the storage capacity around 22 GB per single plane. Optical discs including DVR are preferably housed in cartridges, but application of the invention is not limited to cartridge-type optical discs.

In the present invention, if the multi-layered film formed on the disc substrate is covered with a thin light-transmitting layer, the light-transmitting layer is typically made of a non-magnetic material through which the laser beam from a GaN-family semiconductor laser (having an emission wavelength around 400 nm for blue emission), ZnSe-family semiconductor laser (having an emission wavelength around 500 nm for green emission) or AlGaInP-family semiconductor laser (having an emission wavelength around 635 to 680 nm for red emission) used at least for recording and reproducing information signals can pass. More specifically, it is made of a light-transmitting thermoplastic resin such as polycarbonate.

In the present invention, in the portion of the disc substrate having the concavo-convex structure, width $D_g$ of a level difference of concavo-convex in a portion nearer to the injection side of the laser beam and width $D_l$ of a level difference of concavo-convex in a portion remoter from the injection side of the laser beam satisfy the ratio of $0.5 \leq D_l/D_g \leq 2.0$, or more preferably the ratio of $0.8 \leq D_l/D_g \leq 1.2$.

In the present invention, numerical aperture of the objective lens used for recording and/or reproducing information signals is typically in the range not smaller than 0.45 and not larger than 0.60. In this range of the numerical aperture, the laser beam is irradiated from one side of the optical recording medium where the disc substrate exists.

To obtain good signals, maintain the optical contrast in a good condition and prevent thermal diffusion while preventing the recording layer from becoming discontinuous islands, thickness of the recording layer is typically adjusted in the range not thinner than 5 nm and not thicker than 50 nm, or more preferably, in the range not thinner than 10 nm and not thicker than 40 nm.

In the present invention, thickness of the record-assist layer is limited not to be thinner than 3 nm and not to be thicker than 100 nm, or more preferably in the range not thinner than 5 nm and not thicker than 60 nm.

In the present invention, the recording layer is typically configured to record information signals in a write only mode. In this case, the recording layer is preferably made of a GeTe-family alloy or a GeSbTe-family alloy. However, other materials are also usable for the recording layer, such as Ge—Te, Te—Sb, Te—Ge—Sb, Te—Ge—Sb—Pd, Te—Ge—Sb—Cr, Te—Ge—Sb—Bi, Te—Ge—Sn—O, Te—Ge—Sb—Se, Te—Ge—Sn—Au, In—Sb—Te, In—Sb—Se, Te—Ge—Sb—Sn, In—Sb—Te—Ag, In—Se and Te—Bi.

In the present invention, the optical recording medium is typically configured to record record marks with the laser beam in both the top portions of the ridges and the bottom portions of the furrows of the concavo-convex structure of the disc substrate. That is, the optical recording medium according to the invention employs the land/groove recording technique.

In the present invention, in case the recording layer is made of a phase-changeable material for the purpose of improving the stability of record marks against reproduced light and simultaneously ensuring a good jitter property in high-density recording by mark-edge recording, the phase-changeable recording layer is typically made of a Te—Ge—Sb family alloy (which may contain other elements in addition to Te, Ge and Sb). Its composition is in the range encircled by four points in the triangular graph of FIG. 6, which shows the composition of three components Te, Ge and Sb in coordinates (Te, Ge, Sb), namely, A(0.475, 0.05, 0.475), B(0.665, 0.05, 0.285), C(0.60, 0.40, 0) and D(0.40, 0.60, 0) (composition of the point A is $Te_{47.5}Ge_5Sb_{47.5}$, composition of the point B is $Te_{66.5}Ge_5Sb_{28.5}$, composition of the point C is $Te_{60}Ge_{40}$, and composition of the point D is $Te_{40}Ge_{60}$). More preferably, the record-assist layer containing as its major component at least one compound selected from the group consisting of SiN, SiC, GeN, PbSe, PbTe, SnSe, SnTe, $Bi_2Te_3$ and $Sb_2Te_3$ is preferably formed immediately above and under the phase-changeable recording layer. If the composition of the phase-changeable recording layer is outside the straight line connecting the point A and the point B on the triangular graph of FIG. 6 (where the content of Ge is less than 5 atomic %), then the crystallization temperature decreases, and portions without record marks (pre-recorded portions) become liable to be crystallized by reproduction reproduced light. As a result, boundaries between record marks and pre-recorded portions become ambiguous, and the record marks may deteriorate. Further, if the composition of the phase-changeable recording layer is outside the straight line connecting the point B and the point C and outside the straight line connecting the point D and the point A, then the jitter property deteriorates. If the phase-changeable recording layer is inside the range surrounded by the points A, B, C and D but close to the straight line connecting the point A and the point B (where the content of Ge is 5 atomic % or more, but relatively small), then the difference in optical constant between the amorphous state and the crystal state becomes small. This is not desirable from the viewpoint of the signal quality because the amplitude of the reproduction signal decreases.

In the present invention, more preferable composition range of the phase-changeable recording layer is the range where the coordinates (Te, Ge, Sb) are E(0.47, 0.30, 0.23), F(0.58, 0.30, 0.12), G(0.56, 0.44, 0) and H(0.44, 0.56, 0) on the triangular graph of FIG. 7 similar to FIG. 6. Composition of the point E is $Te_{47}Ge_{30}Sb_{23}$, composition of the point F is $Te_{58}Ge_{30}Sb_{12}$, composition of the point G is $Te_{56}Ge_{44}$, and composition of the point H is $Te_{44}Ge_{56}$.

In the present invention, more preferable composition range of the phase-changeable recording layer is the range where the coordinates (Te, Ge, Sb) are J(0.47, 0.40, 0.13), K(0.55, 0.40, 0.05), L(0.52, 0.48, 0) and M(0.44, 0.56, 0) on the triangular graph of FIG. 8 similar to FIG. 6. Composition of the point J is $Te_{47}Ge_{40}Sb_{13}$, composition of the point K is $Te_{55}Ge_{40}Sb_5$, composition of the point L is $Te_{52}Ge_{48}$, and composition of the point M is $Te_{44}Ge_{56}$.

In the present invention, the record-assist layer is preferably made of a material containing as its major component at least one compound selected from the group consisting of SnTe, SiN, SiC, SnSe, GeN, PbSe, PbTe, $Bi_2Te_3$ and $Sb_2Te_3$. The record-assist layer may be in a mixed crystal state mixing any one of those compounds as well. From the viewpoint of the storage lifetime of the optical recording medium, SnTe is preferably selected from those compounds as the major component of the record-assist layer. In the present invention, the record-assist layer contains one of above-specified compounds and may additionally contain other appropriate material. In this case, the content of any of the above-specified compounds is adjusted to be 50 volume % or more. If the content of the specific compound is less than 50 volume %, the phase-changeable recording layer may fail to crystallize well and may deteriorate the jitter property of the reproduced light. The content of the specific compound in the record-assist layer is more preferably 70 volume % or more. More specifically, usable materials of the record-assist layer are thorium phosphide (ThP), lanthanum sulfide (LaS), scandium antimony (ScSb), thorium selenium (ThSe), calcium selenium (CaSe), lead sulfide (PbS), scandium bismuth (ScBi), thorium arsenide (ThAs), BiSe, indium arsenide (InAs), yttrium tellurium (YTe), gallium antimony (GaSb), PbSe, tin antimony (SnSb), aluminum antimony (AlSb), copper iodide (CuI), strontium selenium (SrSe), SnTe, thorium antimony (ThSb), CaTe, barium sulfide (BaS), LaTe, PbTe, BiTe, SrTe, silver ionide (AgI), $Sb_2Te_3$, $Bi_2Se_3$, $Bi_2Te_3$ and so forth. However, other materials are also usable where appropriate.

In the present invention, in case the multi-layered film on the disc substrate does not include the reflection layer and has the record-assist layer on one surface of the recording layer opposite from the disc substrate, a protective layer is preferably formed on one surface of the record-assist layer opposite from the surface in contact with the recording layer. The protective layer is made of at least one material selected from metal or semi-metal oxides, carbides, nitrides, fluorides and sulfides. More specifically, usable materials of the protective layer are oxides such as silicon oxides ($SiO_2$, SiO), tantalum oxide ($Ta_2O_5$) and zirconium oxide ($ZrO_2$), carbides such as silicon carbide (SiC) and titanium carbide (TiC) or simplex carbon (C), nitrides such as silicon nitride ($Si_3N_4$) aluminum nitride (AlN), sulfides such as zinc sulfide (ZnS), samarium sulfide (SmS) and strontium sulfide (SrS), and fluorides such as magnesium fluoride ($MgF_2$). Further, a mixture containing at least one or more kinds of those materials is preferably used as the material of the protective layer.

In the present invention, to ensure accurate control of the length of the record mark by mark-edge recording, the first reflection layer of the second reflection layer for reflecting light after passing the recording layer is preferably made of a material having thermal conductivity not lower than 50 W/m·K. Examples of materials having thermal conductivity not lower than 50 W/m·K are metals selected from the group consisting of Al, Cr, Ni, Au, hafnium (Hf), palladium (Pd), tantalum (Ta), cobalt (Co), Mo, W, Cu and Ti, or alloys of those metals. Among these materials, desirable materials for forming the reflection layer from various viewpoints are Al—Ti alloys, Al—Cr alloys, Al—Ta alloys, Al—Pd alloys, Al—Cu alloys, Ti—Al alloys, Ti—V alloys, Ti—Pd—Cu alloys, Ag alloys, and so on. Composition of these alloys is determined in accordance with the required property. Other materials are also usable if necessary.

According to the invention having the above-summarized configuration, since the thickness a of the record-assist layer is controlled to be larger than ¼ of the thickness d of the recording layer and smaller than three times of the thickness d, signal property can be changed by not only by changing the size of the concavo-convex but also by modifying the thickness of the record-assist layer. Therefore, design freedom necessary for improvement of the signal property can be increased.

BEST MODE FOR CARRYING OUT THE INVENTIONIDETAILED DESCRIPTION OF THE PRESENTLY PREFERRED EMBODIMENTS

Embodiments of the invention will now be explained below with reference to the drawings.

Figure 1:
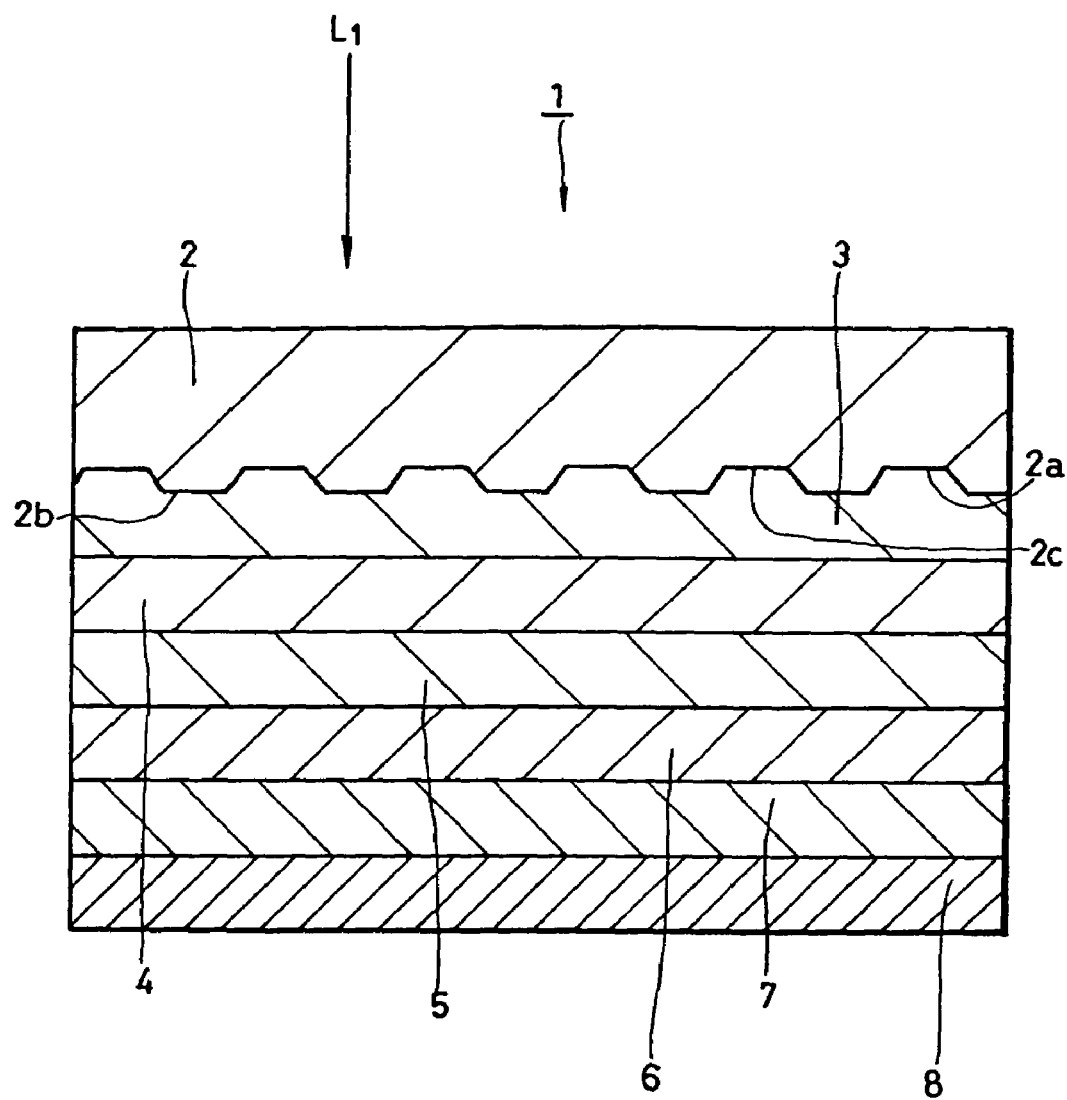
FIG. 1 is a cross-sectional view that shows an optical disc according to the first embodiment of the invention

First explained is an optical disc according to the first embodiment of the invention. FIG. 1 shows the optical disc according to the first embodiment. The optical disc according to the first embodiment is a WO (write once) type on which information signals are recorded in a WO mode.

As shown in FIG. 1, the optical disc 1 according to the first embodiment includes a multi-layered film made of a first dielectric layer 3, recording layer 4, record-assist layer 5, second dielectric layer 6 and first reflection layer 7 that are stacked on one major surface 2a of a disc substrate 2, and an ultraviolet-curing resin layer 8 formed to cover the multi-layered film.

The disc substrate 2 is made of a material that can transmit at least a laser beam used for recording and reproducing information signals. Examples of materials usable for forming the disc substrate 2 are plastic materials such as polycarbonate-family resins, polyolefin resin and acrylic-family resins, and glass. Among these materials, plastic materials are preferable from the economical viewpoint. In the first embodiment, the disc substrate 2 is made of, for example, polycarbonate (PC). The disc substrate 2 is sized 130 mm in diameter and approximately 1.2 mm in thickness, for example.

The major surface 2a of the disc substrate 2 has formed a track-like concavo-convex structure. Ridges of the track-like concavo-convex structure are portions remoter from the laser beam injection side. In the first embodiment, the ridges are called lands 2b. The furrows are portions closer to the laser beam injection side. In the first embodiment, the furrows are called grooves 2c. Ratio between the width $D_l$ of each land 2b and the width $D_g$ of each groove 2, i.e. the duty ratio ($D_l/D_g$), is selected from the range of 0.5 to 2.0. If the duty ratio is smaller than 0.5, then the width $D_l$ of the land 2b is less than one half of the width $D_g$ of the groove 2c, and it is difficult to control both the lands 2b and the grooves 2c to have a common signal property. If the duty ratio is larger than 2.0, then the width $D_g$ of the groove 2c is similarly narrowed to less than one half of the width $D_l$ of the land 2b, and it is again difficult to control both the lands 2b and the grooves 2c to have a common signal property. More preferable range of the duty ratio is 0.8 to 1.2. In an example of configurations and sizes of the disc substrate 2 according to the first embodiment, the track pitch (Tp) of the groove tracks is 0.77 µm, depth of the grooves 2c (depth of the furrows) is 70 nm, width $D_l$ of the lands 2b is 0.82 µm, width $D_g$ of the grooves 2c is 0.72 µm, and the duty ratio is (0.82/0.72=) 1.14.

The first dielectric layer 3 is preferably made of a material exhibiting a low absorption power (absorptivity) to recording/reproducing laser beams, and more specifically, an extinction coefficient k not larger than 0.3. Taking the resistance to heat into consideration as well, SiN is one of preferable materials. Thickness of the first dielectric layer 3 is adjusted not to exceed 200 nm. In the first embodiment, it may be 10 nm thick, for example.

The recording layer 4 is made of GeTe alloy, for example. If the thickness d of the recording layer 4 is smaller than 5 nm, the amplitude is optically too small. If the thickness d is larger than 50 nm, then the recording layer degrades in heat diffusion effect, therefore becomes liable to hold heat therein, and will become incapable of recording record marks clearly. Therefore, thickness d of the recording layer 4 is adjusted in the range of 5 nm≦d≦50 nm. According to the knowledge of the Inventor obtained by an experiment of the signal property in the recording layer 4, thickness d of the recording layer is preferably adjusted in the range of 10 nm≦d≦40 nm, taking account of the range capable of obtaining good signals. In the first embodiment, thickness of the recording layer 4 is around 20 nm, for example.

Material of the record-assist layer 5 contains as its major component at least one compound selected from the group consisting of SnTe, SiN, SiC, GeN, PbTe, SnSe, PbSe, $Bi_2Te_3$ and $Sb_2Te_3$. More specifically, it is a material containing any of the above-specified compounds by at least 50 volume %, or more preferably, by at least 70 volume %. The record-assist layer 5 is preferably in uniform contact with the recording layer 4. In the first embodiment, the record-assist layer 5 is made of SnTe, for example.

Thickness $\underline{a}$ of the record-assist layer 5 is adjusted in the range larger than ¼ of the thickness d of the recording layer 4 and smaller than three times thereof. That is, record-assist layer 5 is formed to satisfy the following relation between its thickness $\underline{a}$ and the thickness d of the recording layer 4, $$d/4 < a < 3d$$

or more preferably to satisfy $$d/2 \leq a \leq 2d$$

Details of the thickness of the record-assist layer 5 will be explained later.

The second dielectric layer 6 is preferably made of a material exhibiting a low absorption power to recording/reproducing laser beams, and more specifically, an extinction coefficient k not larger than 0.3. Taking the resistance to heat into consideration as well, ZnS—$SiO_2$ (especially one having a mol ratio around 4:1) is one of preferable materials. In the first embodiment, the first dielectric layer 3 and the second dielectric layer 6 are made of different materials. However, they may be made of a common material.

The first reflection layer 7 is made of Al alloy, for example. In the first embodiment, it is made of AlTi alloy. If the first reflection layer 7 is thinner than 20 nm, heat generated in the recording layer 4 cannot diffuse sufficiently, and heat is not sufficiently cooled down. If the reflection layer 7 is thicker than 100 nm, then its thermal property and optical property will be adversely affected, and a desired signal property will not be obtained. Therefore, thickness of the first reflection layer 7 is adjusted in the range from 20 to 100 nm. In the first embodiment, it is 60 nm thick, for example.

The ultraviolet-setting resin layer 8 is made of an ultraviolet-setting resin that is cured by irradiation of ultraviolet rays.

In the optical disc according to the first embodiment, having the above-explained configuration, a laser beam $L_1$ is injected toward the multi-layered film including the sequentially stacked first dielectric layer 3, recording layer 4, record-assist layer 5, second dielectric layer 6 and first reflection layer 7 from one side thereof where the disc substrate 2 exists as shown in FIG. 1, and when it irradiates the recording layer 4, an information signal is recorded and/or reproduced.

Next explained is a manufacturing method of the optical disc 1 according to the first embodiment having the above-explained configuration.

First prepared is a clean disk substrate 2 having guide grooves (concavo-convex groove tracks) (for example, thickness: 1.2 mm, track pitch: 0.77 μm, width of lands: 0.82 μm, width of grooves: 0.72 μm, depth of grooves: 70 nm).

Subsequently, the disc substrate 2 is transported into a first sputtering chamber in which a Si target is set, and it is placed on a predetermined position. After that, a film of SiN, for example, is formed on the major surface 2a of the disc substrate 2 by sputtering using nitrogen ($N_2$) gas as the reactive gas. As a result, the first dielectric layer 3 of SiN is deposited on the major surface 2a of the disc substrate 2. An example of the sputtering conditions is using an inactive gas such as argon (Ar) gas and a reactive gas such as $N_2$ gas as the atmospheric gas, adjusting their flow rates to be Ar:$N_2$=3:1, maintaining the pressure of the atmospheric gas in 0.6 Pa, and supplying the sputtering power of 2.5 kW. After that, the disc substrate 2 having formed the first dielectric layer 3 is removed from the first sputtering chamber.

The disc substrate 2 is next introduced into a second sputtering chamber and placed on a predetermined position. Thereafter, a film of GeTe, for example, is formed on the first dielectric layer 3 by sputtering. As a result, the recording layer 4 of GeTe alloy is obtained. An example of the puttering conditions used here is using an inactive gas such as Ar gas as the atmospheric gas, and adjusting the sputtering power to 0.3 kW and the pressure of the atmospheric gas to 0.4 Pa (3.0 mTorr). Under these conditions, the recording layer 4 is formed by using a GeTe alloy target adjusted in composition such that the composition of the layer obtained becomes $Ge_{50}Te_{50}$, for example. After that, the disc substrate 2 having formed the recording layer 4 as well is removed from the second sputtering chamber.

The disc substrate 2 having formed layers up to the recording layer 4 is next introduced into a third sputtering chamber and placed on a predetermined position. After that, a SnTe alloy film is formed on the recording layer 4 by sputtering using a SnTe alloy target. As a result, the record-assist layer 5 of SnTe alloy is formed evenly on the recording layer 4. An example of the sputtering conditions used here is using an inactive gas such as Ar gas as the atmospheric gas, adjusting the sputtering power to 0.3 kW and the pressure of the atmospheric gas to $1.3 \times 10^{-1}$ Pa (1.0 mTorr). Thereafter, the disc substrate 2 having formed layers up to the record-assist layer 5 is removed from the third sputtering chamber.

The disc substrate having formed layers up to the record-assist layer is next introduced into a fourth sputtering chamber and placed on a predetermined position. Thereafter, a ZnS—$SiO_2$ film is formed on the record-assist layer 5 by sputtering using a ZnS—$SiO_2$ target. As a result, the second dielectric layer 6 of ZnS—$SiO_2$ is deposited on the record-assist layer 5. An example of the sputtering conditions used here is using an inactive gas like Ar gas as the atmospheric gas and adjusting the sputtering power to 0.6 kW and the pressure of the atmospheric gas to $1.3 \times 10^{-1}$ Pa (1.0 mTorr). Thereafter, the disc substrate 2 having formed layers up to the second dielectric layer 6 is removed from the fourth sputtering chamber.

The disc substrate 2 having formed layers up to the second dielectric layer 6 is next introduced into a fifth sputtering chamber and placed on a predetermined position. Thereafter, an AlTi film is formed on the second dielectric layer 6 by sputtering using a target of AlTi alloy. As a result, the first reflection layer 7 of AlTi alloy is deposited on the second dielectric layer 6. An example of the sputtering conditions used here is using an inactive gas like Ar gas as the atmospheric gas and adjusting the sputtering power to 2.5 kW and the pressure of the atmospheric gas to $1.3 \times 10^{-1}$ Pa (1.0 mTorr). Thereafter, the disc substrate 2 having formed layers up to the first reflection layer 7 is removed from the fifth sputtering chamber.

After that, the ultraviolet-setting resin layer 8 is formed on the top surface of the first reflection layer 7 by spin coating or roll coating.

Through those steps, the WO type optical disc 1 according to the first embodiment, using GeTe, which is a phase-changeable material, as the recording layer 4 is completed.

As the optical disc 1 according to the first embodiment, which can be manufactured as explained above, the Inventor prepared optical discs 1 that are changed in thickness $a$ of the record-assist layer 5 in the range of $d/4 \leq a \leq 3d$, namely as $a=d/4$, $a=d/2$, $a=d$, $a=2d$ and $a=3d$, and measured their recording and reproducing characteristics by an evaluator. That is, by evaluating recording/reproducing characteristics of find kinds of optical discs 1, the Inventor evaluated dependency of the carrier upon the thickness of the record-assist layer 5. The evaluator used for evaluation of those optical discs was adjusted to use laser beams having the wavelength of 660 nm and adjusted in numerical aperture of the objective lens to 0.575.

Figure 2:
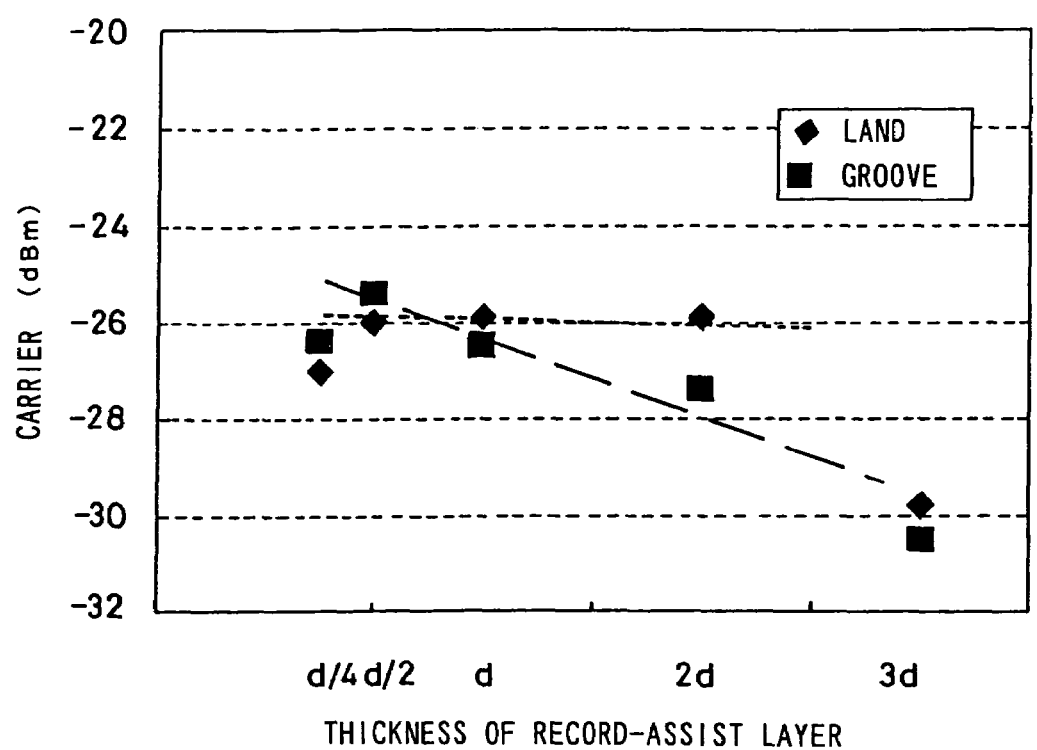
FIG. 2 is a graph that shows dependency or a carrier upon the thickness of a record-assist layer in the optical disc according to the first embodiment of the invention.

A result of this evaluation is shown in FIG. 2. In the graph of FIG. 2, the abscissa indicates the thickness of the record-assist layer 5 and the ordinate indicates the carrier. Evaluated values of lands are shown by ♦ and evaluated values of grooves by ■. The Inventor further carried out optical calculation about dependency of the laser beam amplitude upon the thickness of the record-assist layer 5. A result of the calculation is shown in FIG. 3.

It is appreciated from FIG. 2 that, in grooves, the carrier gradually increases as the thickness $a$ of the record-assist layer 5 decreases within the range from d/4 to 3d. In contrast, in lands, the carrier changes less even when the thickness $a$ of the record-assist layer 5 decreases within the range from d/4 to 3d.

That is, it is understood that the dependency upon the thickness of the record-assist layer 5 in changes of the carrier appears more clearly in grooves. This means that, by intentionally changing the thickness of the record-assist layer 5, the signal characteristics in grooves can be changed while the signal characteristics in lands are maintained substantially constant.

Figure 3:
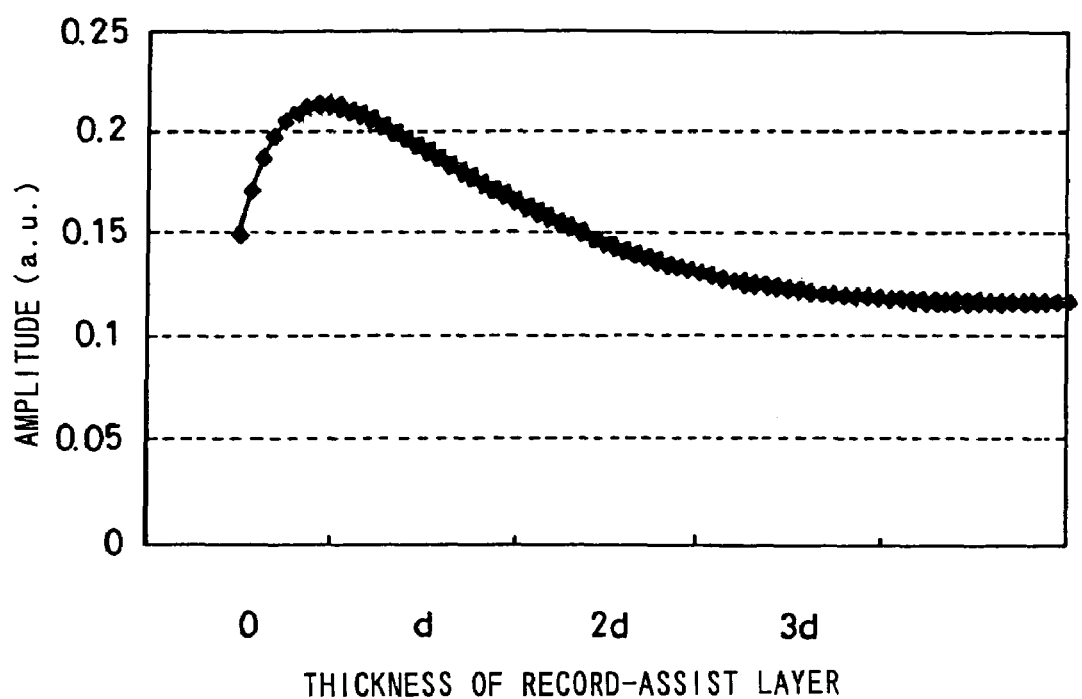
FIG. 3 is a graph that shows dependency of the signal amplitude upon the thickness of the record-assist layer in the optical disc according to the first embodiment of the invention.

It is also appreciated from FIG. 3 that the amplitude rapidly decreases as the thickness $a$ of the record-assist layer 5 is once decreased and thereafter decreased to ¼ of the thickness d of the recording layer 4. This demonstrates that the control of the thickness of the record-assist layer 5 carried out for the purpose of assuring predetermined amplitude becomes very difficult. On the other hand, in case the thickness $a$ of the record-assist layer 5 is larger than ¼ of the thickness of the recording layer 4, changes of the amplitude are very moderate, and it will be easy to control the thickness of the record-assist layer 5. From this point of view, the thickness $a$ of the record-assist layer 5 is preferably larger than ¼ of the thickness d of the recording layer 4.

It is further appreciated from FIG. 2 that, when the thickness $a$ of the record-assist layer 5 is decreased to d/4, both the value of the carrier in lands and the value of the carrier in grooves decreases. Therefore, if the thickness $a$ of the record-assist layer 5 is ¼ or less of the thickness d of the recording layer 4 ($a \leq d/4$), both the signal property of lands and the signal property of grooves deteriorate. That is, the thickness $a$ of the record-assist layer 5 must be larger than ¼ of the thickness d of the recording layer 4 ($d/4 < a$), and it is preferably adjusted to ½ or more of the thickness d of the recording layer 4 ($d/2 \leq a$). Further, according to the knowledge of the Inventor obtained by the experiment, the record-assist layer 5 can be formed not to disconnect in form of islands on the recording layer 4 by adjusting the thickness $a$ of the record-assist layer 5 to be larger than ¼ of the thickness d of the recording layer 4 ($d/4 < a$). Accordingly, it is possible to form the record-assist layer 5 evenly.

It is further appreciated from FIG. 3 that, as the thickness $a$ of the record-assist layer 5 is larger, the amplitude gradually decreases. Therefore, the thickness $a$ of the record-assist layer 5 is preferably adjusted not to exceed three times of the thickness d of the recording layer 4.

It is further appreciated from FIG. 2 that, when the thickness $a$ of the record-assist layer 5 is increased to or beyond three times of the thickness d of the recording layer ($3d \leq a$), both the value of the carrier in lands and the value of the carrier in grooves significantly decreases. Therefore, if the thickness $a$ of the record-assist layer 5 is three times or more of the thickness d of the recording layer ($3d \leq a$), then both the signal property of lands and the signal property of grooves deteriorate and substantially result in the result of calculation shown in FIG. 3. That is, thickness $a$ of the record-assist layer 5 must be limited below three times of the thickness d of the recording layer 4 ($a < 3d$), and it is preferably adjusted not to exceed two times of the thickness d of the recording layer 4 ($a \leq 2d$).

Figure 4:
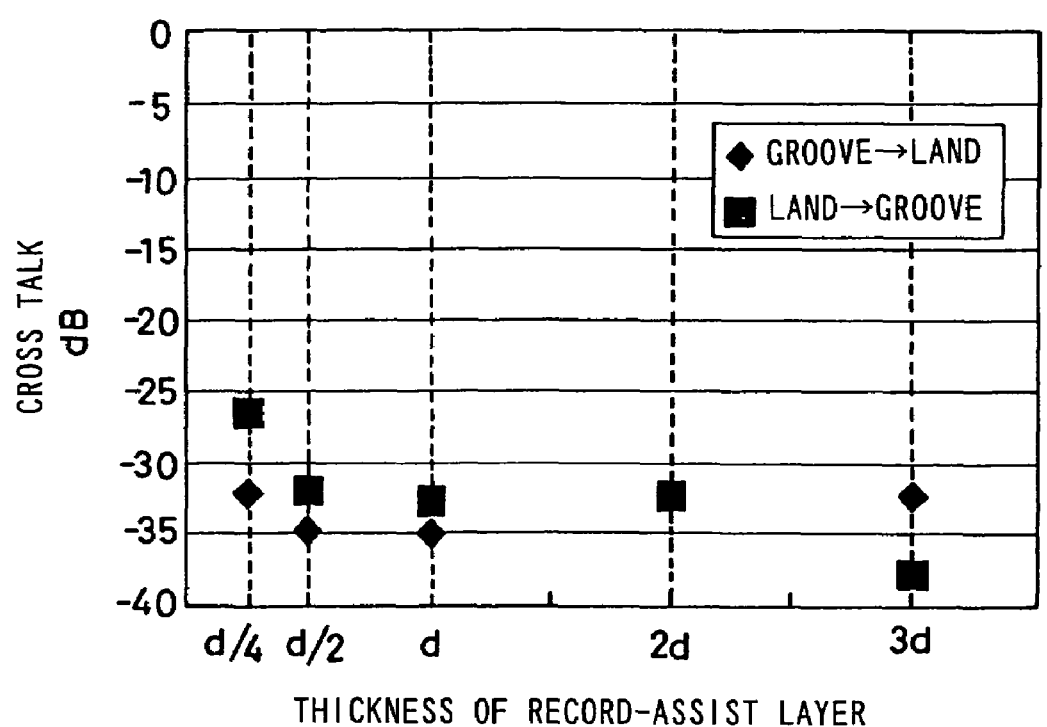
FIG. 4 is a graph that shows dependency of a cross talk signal upon the thickness of the record-assist layer in the optical disc according to the first embodiment of the invention.

For the purpose of investigating dependency of optical cross talk upon the thickness of the record-assist layer, the Inventor measured signal quantities of cross talk from lands to grooves and signal quantities of cross talk from grooves to lands upon recording 2T marks. FIG. 4 shows the dependency of the cross talk signal quantity upon the dependency of the thickness of the record-assist layer 5. In FIG. 4, the ordinate shows cross talk in relative decibel for enabling comparison with the value of the carrier, and indicates cross talk from grooves to lands by ♦ and cross talk from lands to grooves by ■.

It is appreciated from FIG. 4 that, as the thickness $a$ of the record-assist layer 5 decreases from 3d to d/2, cross talk leaking from grooves to lands decreases even though the signal quantity in grooves increases (see FIG. 2). On the other hand, cross talk leaking from lands to grooves increases only a little as the thickness $a$ of the record-assist layer 5 decreases from 3d to d/2, and no remarkable increase is observed. That is, even when the thickness of the record-assist layer 5 is changed, it is apparent that the carrier can be controlled in lands and grooves while suppressing the increase of the cross talk.

As explained heretofore, the optical disc according to the first embodiment, which has the multi-layered film including the first dielectric layer 3, recording layer 4, record-assist layer 5, second dielectric layer 6 and reflection layer 7 deposited on one major surface of the disc substrate 2 and employs the land/groove recording technique, can increase the signal amplitude especially in grooves 2c by adjustment of the thickness $a$ of the record-assist layer to be larger than ¼ of the thickness d of the recording layer 4 and smaller than three times thereof, and can simultaneously keep both the signal property in lands 2b and the signal property in grooves 2c in a good condition by controlling the thickness of the record-assist layer 5 after optimizing the signal property in lands 2b. Furthermore, since the signal amplitude in grooves 2c can be changed by while the signal amplitude in lands 2b is maintained constant, by intentional control of the thickness of the record-assist layer 5, both the signal amplitude in lands 2b and the signal amplitude in grooves 2c can be changed independently from each other. This increases the design freedom and enables optimization of lands 2b and grooves 2c while maintaining the optimum deposition condition of the recording layer 4. Therefore, information signals can be reproduced from optical discs in a good condition of the signal property. Thus a highly reliable optical disc can be obtained.

Figure 5:
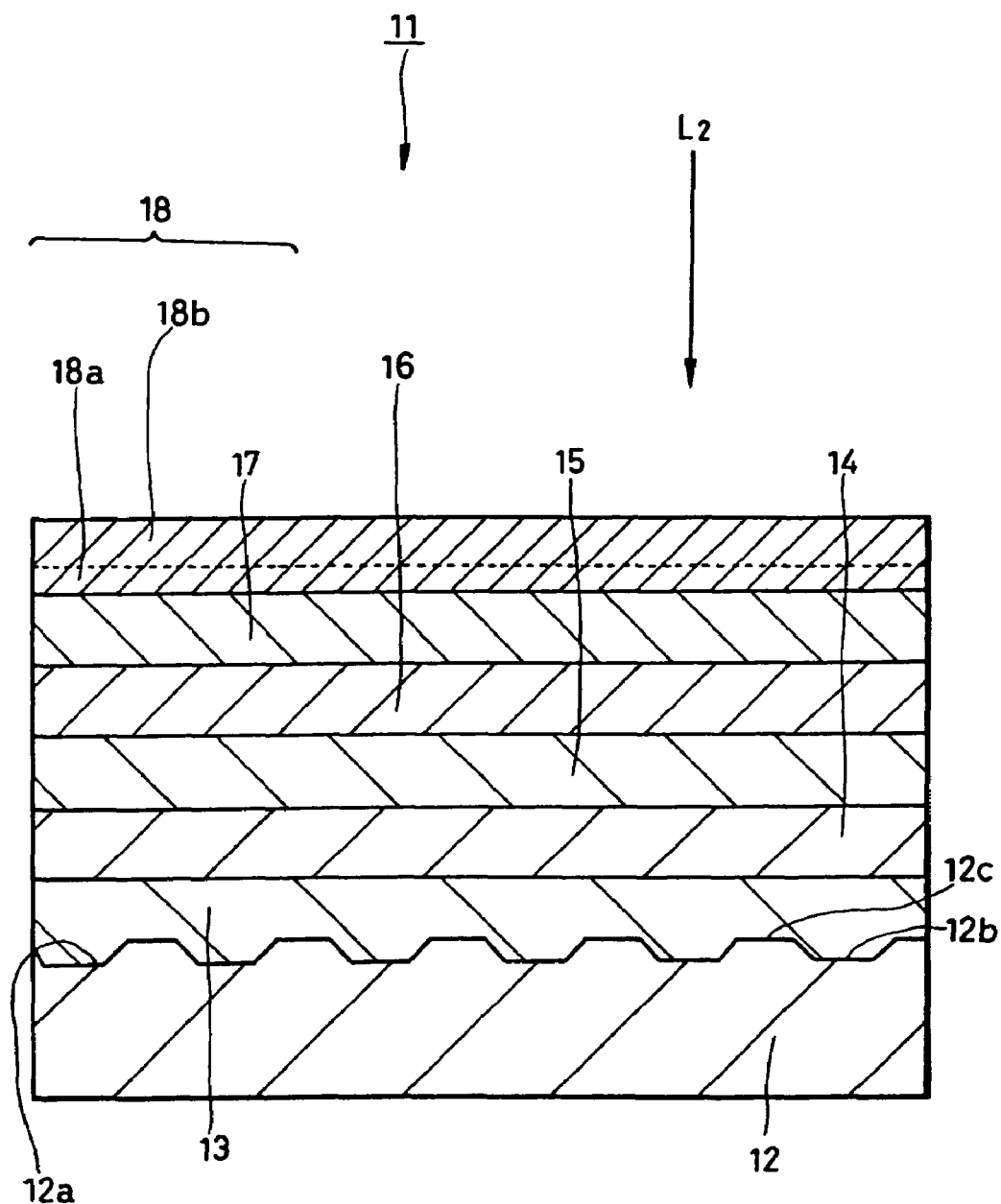
FIG. 5 is a cross-sectional view that shows an optical disc according to the second embodiment of the invention.
Figure 6:
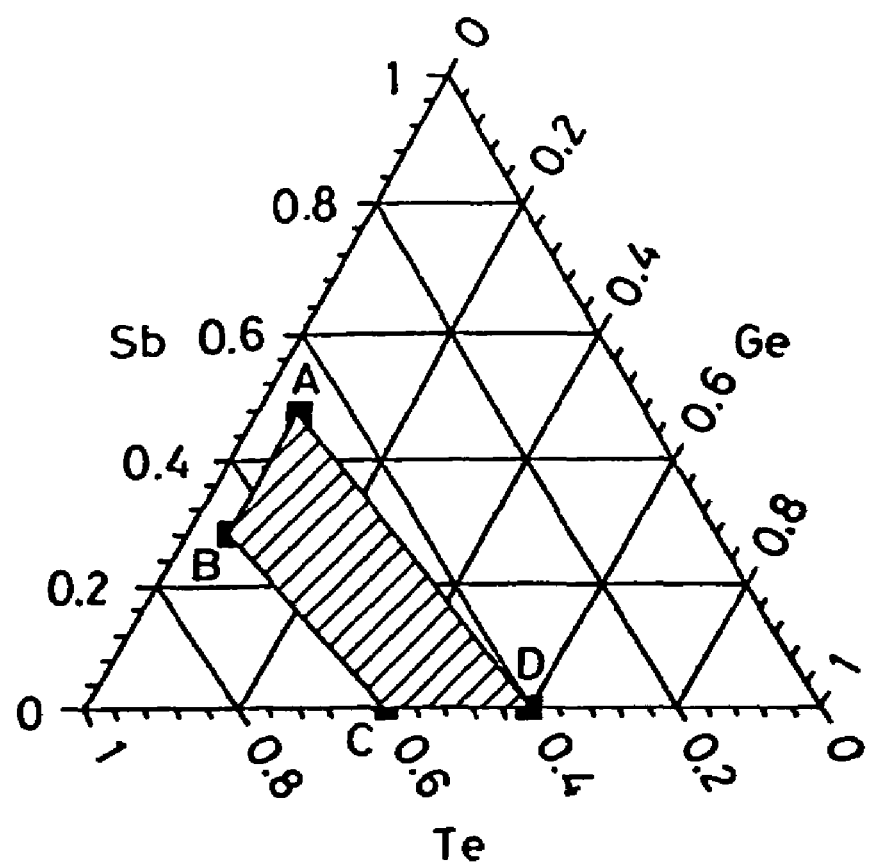
FIG. 6 is a triangular graph that shows suitable composition of a phase-changed recording layer in an optical recording medium according to the invention.
Figure 7:
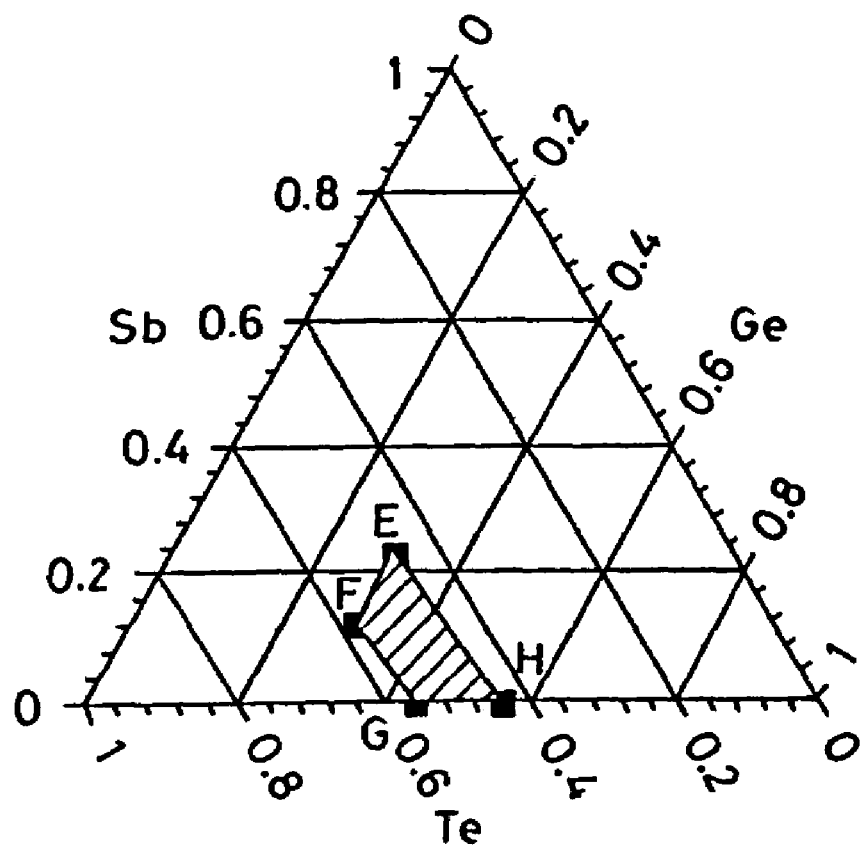
FIG. 7 is a triangular graph that shows suitable composition of a phase-changed recording layer in an optical recording medium according to the invention.
Figure 8:
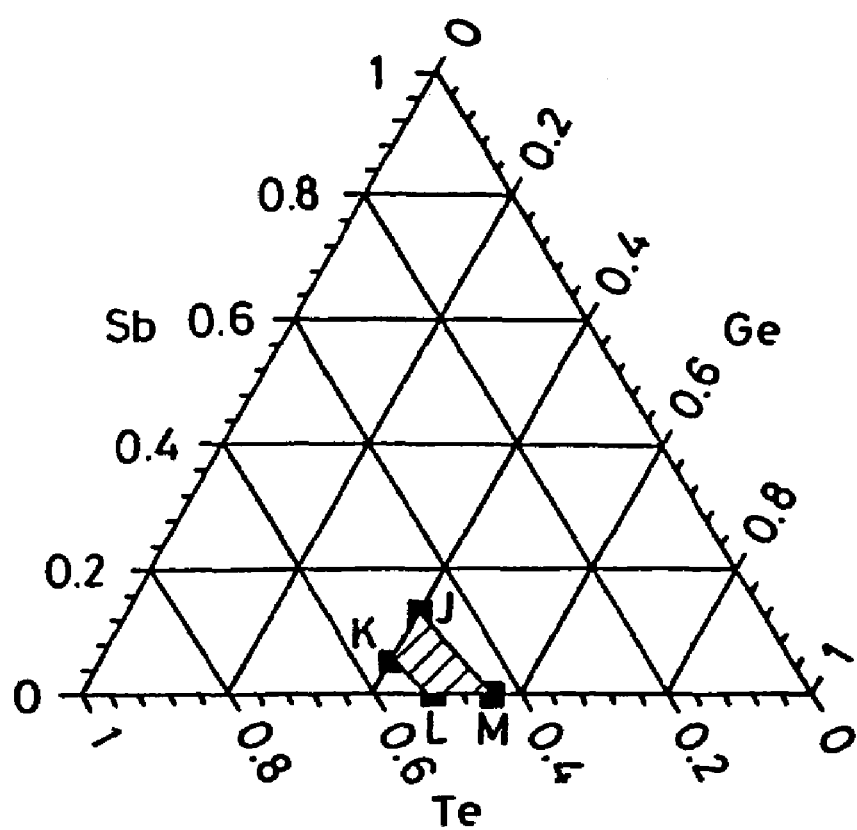
FIG. 8 is a triangular graph that shows suitable composition of a phase-changed recording layer in an optical recording medium according to the invention.

Next explained is an optical disc according to the second embodiment of the invention. FIG. 5 shows the optical disc according to the second embodiment of the invention. The optical disc according to the second embodiment is a programmable optical disc permitting rewriting of information signals.

As shown in FIG. 5, the optical disc 11 according to the second embodiment includes a multi-layered film made of a second reflection layer 13, third dielectric layer 14, record-assist layer 15, recording layer 16 and fourth dielectric layer 17 sequentially stacked on one major surface 12a of a disc substrate 12, and a light-transmitting layer 18 formed to cover the multi-layered film.

The disc substrate 12 is made of a low water-absorbing material such as polycarbonate (PC) or cycloolefin polymer (such as Zeonex (registered trademark)). Thickness of the disc substrate 12 is, for example, in the range from 0.6 to 1.2 mm. In the second embodiment, it is 1.1 mm thick, for example. Diameter of the disc substrate 12 is 120 mm for example. The optical disc according to the second embodiment is configured to record/reproduce information signals when a laser beam is irradiated to he disc substrate 12 from one side thereof where the thin light-transmitting layer 18 exists. Therefore, the disc substrate 12 can be selected without taking it into consideration whether the material is permeable or not, and a substrate of a metal such as Al is also usable. Alternatively, a glass substrate or a resin substrate of polyolefin, polyimide, polyamide, polyphenylene sulfide or polyethylene terephthalate is also usable as the disc substrate 12.

The major surface 12a of the disc substrate 12 has formed a track-like concavo-convex structure. Furrows of the track-like concavo-convex structure are portions remoter from the laser beam injection side. In the second embodiment, the furrows are called lands 2b. The ridges are portions closer to the laser beam injection side. In the second embodiment, the ridges are called grooves 12c. From the same reasons as those of the first embodiment, ratio between the width $D_l$ of each land 2b and the width $D_g$ of each groove 2, i.e. the duty ratio ($D_l/D_g$), is selected from the range of 0.5 to 2.0, or more preferably from the range of 0.8 to 1.2. In an example of configurations and sizes of the disc substrate 12 according to the second embodiment, the track pitch (Tp) of the groove tracks is 0.77 µm, depth of the grooves (depth of the furrows) is 70 nm, width $D_l$ of the lands 12b is 0.82 µm, width $D_g$ of the grooves 12c is 0.72 µm, and the duty ratio is (0.82/0.72=) 1.14.

The second reflection layer 13 is made of Al alloy, for example. In the second embodiment, it is made of AlTi alloy. From the same reasons as those of the first embodiment, thickness of the second reflection layer 13 is adjusted in the range from 20 to 100 nm. For example, it may be 60 nm thick.

The third dielectric layer 14 is preferably made of a material exhibiting a low absorption power to recording/reproducing laser beams, and more specifically, an extinction coefficient k not larger than 0.3. Taking the resistance to heat into consideration as well, $ZnS-SiO_2$ (especially one having a mol ratio around 4:1) is one of preferable materials.

Material of the record-assist layer 15 contains as its major component at least one compound selected from the group consisting of SnTe, SiN, SiC, GeN, PbTe, SnSe, PbSe, $Bi_2Te_3$ and $Sb_2Te_3$. More specifically, it is a material containing any of the above-specified compounds by at least 50 volume %, or more preferably, by at least 70 volume %. The record-assist layer 15 is preferably in uniform contact with the recording layer 16. In the second embodiment, the record-assist layer 15 is made of SnTe, for example.

From the same reasons as those of the first embodiment, thickness a of the record-assist layer 15 is adjusted in the range larger than ¼ of the thickness d of the recording layer 16, explained later, and smaller than three times of same. That is, record-assist layer 15 is formed to satisfy the following relation between its thickness a and the thickness d of the recording layer 16, $$d/4 < a < 3d$$

or more preferably to satisfy $$d/2 \leq a \leq 2d$$

from the viewpoint of improving the signal property.

The recording layer 16 is made of GeTe alloy, for example. From the same reasons as those of the first embodiment, thickness d of the recording layer 4 is adjusted in the range of 5 nm $\leq$ d $\leq$ 50 nm. According to the knowledge of the Inventor obtained by an experiment of the signal property in the recording layer 16, thickness d of the recording layer is preferably adjusted in the range of 10 nm $\leq$ d $\leq$ 40 nm, taking account of the range capable of obtaining good signals. In the first embodiment, thickness of the recording layer 16 is around 20 nm, for example.

The fourth dielectric layer 17 is preferably made of a material exhibiting a low absorption power (absorptivity) to recording/reproducing laser beams, and more specifically, an extinction coefficient k not larger than 0.3. Taking the resistance to heat into consideration as well, SiN is one of preferable materials. Thickness of the fourth dielectric layer 17 is adjusted not to exceed 200 nm. In the second embodiment, it may be 10 nm thick, for example. In the second embodiment, the third dielectric layer 14 and the fourth dielectric layer 17 are made of different materials. However, they may be made of a common material.

In the optical disc according to the second embodiment, having the above-explained configuration, a laser beam $L_2$ is injected toward the disc substrate 12 from one side thereof where the multi-layered film exists as shown in FIG. 5, and when it irradiates the recording layer 16 above the lands 12b and above the grooves 12c, information signals are recorded and/or reproduced.

Next explained is a manufacturing method of the optical disc 11 according to the second embodiment having the above-explained configuration.

First prepared is a clean disk substrate 12 having guide grooves (concavo-convex groove tracks) (for example, thickness: 1.1 mm, track pitch: 0.77 µm, width of lands: 0.82 µm, width of grooves: 0.72 µm, depth of grooves: 70 nm).

Subsequently, the disc substrate 12 having formed the concavo-convex groove tracks is transported into a first sputtering chamber, and placed in a predetermined position.

Thereafter, an AlTi film is formed at least on groove tracks with ridges and grooves by sputtering using a target of AlTi alloy. As a result, the second reflection layer 13 of AlTi alloy is deposited on the disc substrate 12. An example of the sputtering conditions used here is using an inactive gas like Ar gas as the atmospheric gas and adjusting the sputtering power to 2.5 kW and the pressure of the atmospheric gas to $1.3 \times 10^{-1}$ Pa (1.0 mTorr). Thereafter, the disc substrate 12 having formed the second reflection layer 13 is removed from the first sputtering chamber.

The disc substrate having formed the second reflection layer 13 is next introduced into a second sputtering chamber and placed on a predetermined position. Thereafter, a ZnS—SiO$_2$ film is formed on the second reflection layer 13 by sputtering using a ZnS—SiO$_2$ target. As a result, the third dielectric layer 14 of ZnS—SiO$_2$ is deposited on the second reflection layer 13. An example of the sputtering conditions used here is using an inactive gas like Ar gas as the atmospheric gas and adjusting the sputtering power to 0.6 kW and the pressure of the atmospheric gas to $1.3 \times 10^{-1}$ Pa (1.0 mTorr). Thereafter, the disc substrate 12 having formed layers up to the third dielectric layer 14 is removed from the second sputtering chamber.

The disc substrate 12 having formed layers up to the third dielectric layer 14 is next introduced into a third sputtering chamber and placed on a predetermined position. After that, a SnTe alloy film is deposited on the third dielectric layer 14 by sputtering using a SnTe alloy target. As a result, the record-assist layer 15 of SnTe alloy is formed evenly on the third dielectric layer 14. An example of the sputtering conditions used here is using an inactive gas such as Ar gas as the atmospheric gas, adjusting the sputtering power to 0.3 kW and the pressure of the atmospheric gas to $1.3 \times 10^{-1}$ Pa (1.0 mTorr). Thereafter, the disc substrate 12 having formed layers up to the record-assist layer 15 is removed from the third sputtering chamber.

The disc substrate 12 having formed layers up to the record-assist layer 15 is next introduced into a fourth sputtering chamber and placed on a predetermined position. Thereafter, a film of GeSbTe, for example, is formed on the record-assist layer 15 by sputtering. As a result, the recording layer 16 of GeSbTe alloy is obtained. An example of the sputtering conditions used here is using an inactive gas such as Ar gas as the atmospheric gas, adjusting the sputtering power to 0.3 kW and the pressure of the atmospheric gas to 0.4 Pa (3.0 mTorr). Thereafter, the disc substrate 12 having formed layers up to the recording layer 16 is removed from the fourth sputtering chamber.

The disc substrate 12 is next introduced into a fifth sputtering chamber and placed on a predetermined position. After that, a film of SiN, for example, is formed on the second reflection layer 13 by sputtering using nitrogen (N$_2$) gas as the reactive gas. As a result, the third dielectric layer 14 of SiN is deposited on the second reflection layer 13. An example of the sputtering conditions is using an inactive gas such as argon (Ar) gas and a reactive gas such as N$_2$ gas as the atmospheric gas, adjusting their flow rates to be Ar:N$_2$=3:1, maintaining its pressure in 0.6 Pa, and supplying the sputtering power of 2.5 kW. After that, the disc substrate 12 having formed the fourth dielectric layer 17 is removed from the fifth sputtering chamber.

Thereafter, a light-transmitting sheet 18b is bonded via a bonding layer 18a to the multi-layered film made of the second reflection layer 13, third dielectric layer 14, record-assist layer 15, recording layer 16 and fourth dielectric layer 17 by using a predetermined bonding machine (not shown). As a result, the light-transmitting layer 18 is formed.

Through those steps, the optical disc 11 according to the second embodiment is completed.

With the optical disc 11 according to the second embodiment, the same effects as those of the first embodiment can be obtained by limiting the thickness $\underline{a}$ of the record-assist layer 15 within the range of $d/4<\underline{a}<3d$ relative to the thickness d of the recording layer 16, and it has been confirmed that the same effects as those of the optical disc 1 according to the first embodiment can be ensured also with the optical disc 11 having that configuration.

Although the invention has been explained by way of specific embodiments, the invention is not limited to those embodiments but can be modified in various modes based on the technical concept of the invention.

For example, numerical values and materials shown in the explanation of the embodiments are not but mere examples, and other numerical values and materials may be used if necessary.

For example, the first embodiment has been explained as applying the invention to a WO type optical disc having the recording layer 4 made of a phase-changeable material and configured to record in a WO manner. However, application of the invention is not limited to WO type optical discs, but can be extended to other type optical discs such as programmable optical discs.

The second embodiment has been explained as using AlTi alloy as the material of the second reflection layer 13. However, material of the second reflection layer 13 may be selected from other Al alloys such as AlCu alloy, Al, silver (Ag), Ag alloys such as AgPdCu alloys, copper (Cu), Cu alloys, and so on. Moreover, although the second embodiment has been explained as using the recording layer made of GeSbTe alloy, any other appropriate material such as GeTe alloy, GeInSbTe alloy, AgInSbTe alloy, or the like, can be used in accordance with the desired property.

Furthermore, although the second embodiment has been explained as employing 0.77 µm as the track pitch Tp of the concavo-convex tracks formed on one major surface 12a of the disc substrate 12, a different value may be employed where necessary. In case a blue laser having the wavelength around 405 nm is used as the laser beam and NA is enhanced approximately to 0.85 by using two-group lenses, the track pitch Tp may be reduced to 0.74 µm or smaller, such as around 0.3 µm.

As described above, the invention enables freer design of optical recording mediums for obtaining more excellent signal characteristics and ensures optical mediums having excellent signal characteristics and high reliability by adjusting the thickness d of the recording layer and the thickness $\underline{a}$ of the record-assist layer to satisfy $d/4<\underline{a}<3d$ in optical recording mediums having the recording layer capable of recording information signals by irradiation of a laser beam and the multi-layered film stacking at least the recording layer and the record-assist layer at least on one surface of the disc substrate having formed concavo-convex.

The invention claimed is:
1. An optical recording medium comprising:
   a disc substrate having formed a concavo-convex structure formed at least on one surface thereof; and
   a multi-layered film made by stacking at least a recording layer capable of recording information signals by irradiation of a laser beam and a record-assist layer adjacent to the recording layer on the surface of the disc substrate having the concavo-convex structure,
   wherein, d/4<a<3d is satisfied where d is the thickness of the recording layer and a is the thickness of the auxiliary recording layer, and in a portion of the disc substrate having the concavo-convex structure, width $D_g$ of a level difference of a portion nearer to the injection side of the laser beam and width $D_1$ of a level difference of a portion remoter from the injection side of the laser beam satisfy the ratio of $0.5 \leq D_1/D_g \leq 2.0$.

2. An optical recording medium according to claim 1 wherein said recording layer can record the information signals by reversible changes at least between two different states.

3. An optical recording medium according to claim 1 wherein said recording layer is made of a phase-changeable material capable of recording the information signals by phase changes between a crystal phase and an amorphous phase.

4. An optical recording medium according to claim 1 wherein the laser beam used for recording and/or reproducing information signals is irradiated to said recording layer from one side of the multi-layered film where the disc substrate exists.

5. An optical recording medium according to claim 4 wherein said multi-layered film includes a first dielectric layer, said recording layer, said record-assist layer, a second dielectric layer and a first reflection layer that are stacked sequentially from near the surface of the disc substrate having formed the concavo-convex structure.

6. An optical recording medium according to claim 4 wherein a layer of a synthetic resin is formed to cover the multi-layered film on the disc substrate.

7. An optical recording medium according to claim 1 wherein the laser beam used for recording and/or reproducing information signals is irradiated to the recording layer from one side of the disc substrate where the multi-layered film exists.

8. An optical recording medium according to claim 7 wherein said multi-layered film is made of a second reflection layer, third dielectric layer, said record-assist layer, said recording layer and a fourth dielectric layer that are stacked sequentially from near one surface of the disc substrate having said concavo-convex structure.

9. An optical recording medium according to claim 7 wherein a light-transmitting layer permitting the laser beam to pass through is formed to cover the multi-layered film on the disc substrate.

10. An optical recording medium according to claim 1 wherein, in a portion of the disc substrate having the concavo-convex structure, width $D_g$ of a level difference of a portion nearer to the injection side of the laser beam and width $D_1$ of a level difference of a portion remoter from the injection side of the laser beam satisfy the ratio of $0.8 \leq D_1/D_g \leq 1.2$.

11. An optical recording medium according to claim 1 wherein an objective lens used for recording and/or reproducing the information signals has a numerical aperture not smaller than 0.45 and not larger than 0.60.

12. An optical recording medium according to claim 1 wherein thickness of the recording layer is in the range not smaller than 5 nm and not larger than 50 nm.

13. An optical recording medium according to claim 1 wherein thickness of said recording layer is in the range not smaller than 10 nm and not larger than 40 nm.

14. An optical recording medium according to claim 1 wherein thickness of said record-assist layer is in the range not smaller than 3 nm and not larger than 100 nm.

15. An optical recording medium according to claim 1 wherein thickness of said record-assist layer is in the range not smaller than 5 nm and not larger than 60 nm.

16. An optical recording medium according to claim 1 wherein said recording layer is capable of recording the information signals in a write only mode.

17. An optical recording medium according to claim 1 wherein said recording layer is made of GeTe alloy or GeSbTe alloy.

18. An optical recording medium according to claim 1 wherein said record-assist layer is made of a material containing as its major component at least one compound selected from the group consisting of SnTe, SiN, SiC, SnSe, GeN, PbSe, PbTe, $Bi_2Te_3$ and $Sb_2Te_3$.

19. An optical recording medium according to claim 1 wherein record marks can be recorded on both portions of the recording layer on top surfaces of ridges and portions of the recording layer on bottoms of the furrows of the concavo-convex structure of the disc substrate by said laser beam.

20. An optical recording medium according to claim 1 wherein said recording layer is located nearer to the irradiation side of the laser beam.

21. A method of manufacturing an optical recording medium, which forms a multi-layered film made by stacking at least a recording layer capable of recording information signals by irradiation of a laser beam and a record-assist layer adjacent to the recording layer on the surface of the disc substrate having the concavo-convex structure, comprising:

adjusting the thickness of the record-assist layer to satisfy d/4<a<3d where d is the thickness of the recording layer and a is the thickness of the record-assist layer.

wherein, in a portion of the disc substrate having the concavo-convex structure, width $D_g$ of a level difference of a portion nearer to the injection side of the laser beam and width $D_1$ of a level difference of a portion remoter from the injection side of the laser beam satisfy the ratio of $0.5\ D_1/D_g \leq 2.0$.

22. A method of manufacturing an optical recording medium according to claim 21 wherein said recording layer is made of a material capable of recording the information signals by reversible changes at least between two different states.

23. A method of manufacturing an optical recording medium according to claim 21 wherein said recording layer is made of a phase-changeable material capable of recording the information signals by phase changes between a crystal phase and an amorphous phase.

24. A method of manufacturing an optical recording medium according to claim 21 wherein the optical recording medium is configured to record the information signals in the recording layer by irradiation of the laser beam to the recording layer from one side of the multi-layered film where the disc substrate exists.

25. A method of manufacturing an optical recording medium according to claim 24 wherein said multi-layered film is made by stacking a first dielectric layer, said recording layer, said record-assist layer, a second dielectric layer and a first reflection layer that are stacked sequentially from near the surface of the disc substrate having formed the concavo-convex structure.

26. A method of manufacturing an optical recording medium according to claim 24 wherein a layer of a synthetic resin is formed to cover the multi-layered film after the multi-layered film is formed on the disc substrate.

27. A method of manufacturing an optical recording medium according to claim 21 wherein the optical recording medium is configured to record the information signals in the recording layer by irradiation of the laser beam to the recording layer from one side of the disc substrate where the multi-layered film exists.

28. A method of manufacturing an optical recording medium according to claim 27 wherein said multi-layered film is made by stacking a second reflection layer, third dielectric layer, said record-assist layer, said recording layer and a fourth dielectric layer sequentially from near one surface of the disc substrate having said concavo-convex structure.

29. A method of manufacturing an optical recording medium according to claim 27 wherein a light-transmitting layer permitting the laser beam to pass through is formed to cover the multi-layered film after the multi-layered film is formed on the disc substrate.

30. A method of manufacturing an optical recording medium according to claim 21 wherein, in a portion of the disc substrate having the concavo-convex structure, width $D_g$ of a level difference of a portion nearer to the injection side of the laser beam and width $D_1$ of a level difference of a portion remoter from the injection side of the laser beam satisfy the ratio of $0.8 \leq D_1/D_g \leq 1.2$.

31. A method of manufacturing an optical recording medium according to claim 21 wherein an objective lens used for recording and/or reproducing the information signals has a numerical aperture not smaller than 0.45 and not larger than 0.60.

32. A method of manufacturing an optical recording medium according to claim 21 wherein the recording layer is formed to have a thickness in the range not smaller than 5 nm and not larger than 50 nm.

33. A method of manufacturing an optical recording medium according to claim 21 wherein the recording layer is formed to have a thickness in the range not smaller than 10 nm and not larger than 40 nm.

34. A method of manufacturing an optical recording medium according to claim 21 wherein said record-assist layer is formed to have a thickness in the range not smaller than 3 nm and not larger than 100 nm.

35. A method of manufacturing an optical recording medium according to claim 21 wherein said record-assist layer is formed to have a thickness in the range not smaller than 5 nm and not larger than 60 nm.

36. A method of manufacturing an optical recording medium according to claim 21 wherein said recording layer is formed to be capable of recording the information signals in a write only mode.

37. A method of manufacturing an optical recording medium according to claim 21 wherein said recording layer is made of GeTe alloy or GeSbTe alloy.

38. A method of manufacturing an optical recording medium according to claim 21 wherein said record-assist layer is made of a material containing as its major component at least one compound selected from the group consisting of SIC, SiN, SnTe, SnSe, GeN, PbSe, PbTe, $Bi_2Te_3$ and $Sb_2Te_3$.

39. A method of manufacturing an optical recording medium according to claim 21 wherein the optical recording medium is formed to be capable of recording record marks in top portions of ridges and bottom portions of furrows of the concavo-convex structure of the disc substrate.

* * * * *